June 12, 1928.
C. Z. SMITH
AUTOMOBILE BRAKE
Original Filed Sept. 27, 1924
1,673,714
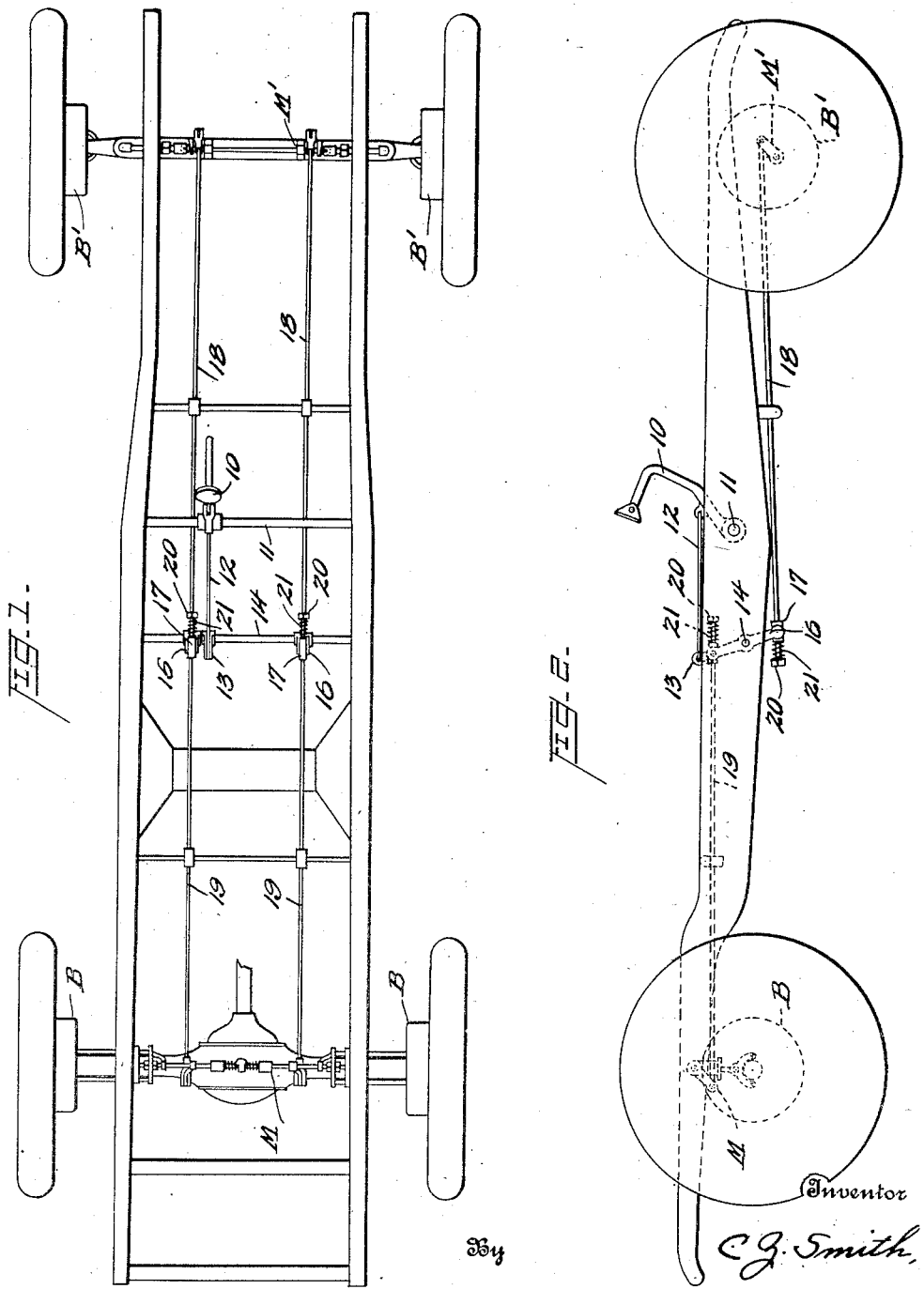

Patented June 12, 1928.

1,673,714

UNITED STATES PATENT OFFICE.

CLARENCE Z. SMITH, OF ATLANTA, GEORGIA.

AUTOMOBILE BRAKE.

Original application filed September 27, 1924, Serial No. 740,303. Divided and this application filed June 25, 1926. Serial No. 118,580.

This invention relates to vehicle brakes and particularly to mechanism for bringing about a differential action between the front and rear brakes of a vehicle provided with braking means for the front wheels as well as the rear wheels.

In my application Serial Number 740,303 filed September 27, 1924, a complete mechanism for simultaneous actuation of two front wheel and two rear wheel brakes of a motor vehicle is disclosed and the subject matter of the present application comprises, as above suggested, the means whereby the braking forces applied to the rear wheels of the vehicle are caused to be at all times greater, when the brakes are applied, than the braking forces developed at the front wheels. A number of mechanisms embodying the principle of the invention may be developed for accomplishing this result without departure from the scope and spirit of the invention and the preferred embodiment which is disclosed herein is set forth by way of example only. In the drawings:

Figure 1 illustrates in plan a motor vehicle chassis with the invention incorporated therein; and Figure 2 is a side elevation of the same.

The braking mechanisms are not illustrated in detail inasmuch as they are fully disclosed in my copending applications Serial Nos. 740,303 and 687,602, and the specific details of the brake actuating mechanisms positioned upon the front and rear axles are not disclosed inasmuch as these mechanisms are also fully disclosed in my copending application Serial No. 740,303.

The rear brakes are indicated generally at B, the front brakes at B', the rear brake actuating mechanism at M, and the front brake actuating mechanism at M'. A manually operable member, in this instance a foot pedal indicated at 10 which pedal is mounted upon a transverse shaft 11 and adapted to have a limited rocking movement fore and aft of the chassis, is connected by a link 12 to a lever arm 13 fixed upon a rock shaft 14 having its ends rotatably supported in the side frame members of the chassis. Fixed upon rock shaft 14 are double arm levers 15 and 16 which are disposed in parallel relationship and each end of each of these levers is bifurcated, a cylindrical bearing block 17 being pivotally supported between the arms of each yoke like lever end. Each of these blocks 17 is centrally apertured to provide an opening through which the brake rods extend.

The brake rods extending to the front wheel brake operating mechanism M' are indicated at 18 and these brake rods extend through the lower pair of blocks 17 while the rear wheel brake rods are indicated at 19 and extend through the upper pair of blocks 17. Each end of each rod is provided with a nut 20 and intermediate each nut and the corresponding pivoted bearing block 17 is positioned a coiled compression spring 21. The upper pair of these springs is associated with the brake rods 19 for the rear wheels are stiffer than the lower pair of springs and as a consequence a greater proportion of the force manually exerted upon the foot lever 10 is transmitted to the rear wheel brake operating mechanism M than is transmitted to the front wheel brake operating mechanism M', it being apparent that depression of the foot pedal causes clockwise rotation of shaft 14 and compression of the springs 21. It is apparent by the mechanism just described that a differential action of the front and rear wheel brakes may be realized. The degree of difference may be regulated by adjusting the nuts 20, and in fact springs of the same strength may be employed if thought desirable and the differential action obtained by bringing the upper set of nuts 20 closer to their respective blocks 17 than the lower set. Other ways of bringing about the desired results may be devised and the invention is therefore not limited to any particular form.

Having thus described the invention, what is claimed as new and desired to be secured by Letters Patent is:

1. Apparatus for simultaneously operating the front and rear wheel brakes of a vehicle, including in combination, an operating member, and connections between said operating member and each of said brakes including yielding members, the yielding members in the rear brake connections being more resistant to deformation than the yielding members in the front brake connections, whereby a greater proportion of the force exerted upon the operating member is transmitted to the rear wheel brakes than to the front wheel brakes.

2. Apparatus for simultaneously operating the front and rear wheel brakes of a vehicle including in combination, a manually operable lever, a rock shaft connected thereto, arms on said rock shaft, links slidably mounted in the ends of said arms and connected to the front and rear wheel brakes respectively, coil springs surrounding said links and compressible between said arms and abutments on said links, said arms being of equal length and the springs associated with the links connected to the rear wheel brakes being more resistant to deformation than the springs associated with the links connected to the front wheel brakes, whereby a greater proportion of the force exerted on said lever is transmitted to the rear wheel brakes than to the front wheel brakes.

In testimony whereof I hereunto affix my signature.

CLARENCE Z. SMITH.